United States Patent
Matsumoto

(10) Patent No.: US 11,387,697 B2
(45) Date of Patent: Jul. 12, 2022

(54) ROTARY ELECTRIC MACHINE

(71) Applicant: TOYOTA JIDOSHA KABUSHIKI KAISHA, Toyota (JP)

(72) Inventor: Takashi Matsumoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 97 days.

(21) Appl. No.: 16/706,973

(22) Filed: Dec. 9, 2019

(65) Prior Publication Data

US 2020/0235620 A1 Jul. 23, 2020

(30) Foreign Application Priority Data

Jan. 23, 2019 (JP) .............................. JP2019-009529

(51) Int. Cl.
| | |
|---|---|
| *H02K 1/32* | (2006.01) |
| *H02K 1/14* | (2006.01) |
| *H02K 1/27* | (2022.01) |
| *H02K 21/16* | (2006.01) |
| *H02K 1/276* | (2022.01) |

(52) U.S. Cl.
CPC .............. *H02K 1/32* (2013.01); *H02K 1/146* (2013.01); *H02K 1/276* (2013.01); *H02K 21/16* (2013.01)

(58) Field of Classification Search
CPC .......... H02K 1/146; H02K 1/276; H02K 1/32; H02K 21/16; H02K 1/2766
USPC ......................................................... 310/61
See application file for complete search history.

(56) References Cited

U.S. PATENT DOCUMENTS

| | | | | |
|---|---|---|---|---|
| 1,316,790 A | * | 9/1919 | Gruber ..................... | H02K 9/06 310/62 |
| 2007/0194638 A1 | | 8/2007 | Birdi et al. | |
| 2015/0381015 A1 | | 12/2015 | Hattori | |
| 2016/0226355 A1 | * | 8/2016 | Arita ........................ | H02K 1/14 |

FOREIGN PATENT DOCUMENTS

| | | |
|---|---|---|
| CN | 105580255 A | 5/2016 |
| JP | 56-149561 U | 11/1981 |
| JP | 1-61841 U | 4/1989 |
| JP | 2004-312898 A | 11/2004 |
| JP | 2014-230408 A | 12/2014 |
| JP | 2016-54608 A | 4/2016 |

OTHER PUBLICATIONS

English translation of relevant part of the Japanese Office Action dated Mar. 23, 2021 in corresponding Japanese Patent Application No. 2019-009529, 1 pages.

* cited by examiner

*Primary Examiner* — Alex W Mok
(74) *Attorney, Agent, or Firm* — Oblon, McClelland, Maier & Neustadt, L.L.P.

(57) ABSTRACT

A tooth of a stator is divided into two tooth segments, and an inter-segment gap is formed between the segments. The inter-segment gap is open toward a slot which is a space between adjacent teeth. A cooling fluid is sent to the inter-segment gap from an in-rotor-core flow channel of a rotor core, and the sent cooling fluid directly contacts and cools a coil conductor wiring in the slot.

4 Claims, 7 Drawing Sheets

ROTARY ELECTRIC MACHINE

CROSS REFERENCE TO RELATED APPLICATION

This application claims priority to Japanese Patent Application No. 2019-009529 filed on Jan. 23, 2019, which is incorporated herein by reference in its entirety including the specification, claims, drawings, and abstract.

TECHNICAL FIELD

The present disclosure relates to a rotary electric machine, and in particular to cooling of a stator.

BACKGROUND

A electric motor which converts electric energy into kinetic energy of rotation, a electric generator which converts the kinetic energy of rotation into the electric energy, and electric devices which function both as the electric motor and the electric generator are known. In the following description, these electric devices will be collectively referred to as rotary electric machines. A typical rotary electric machine comprises a rotor, and a stator which is placed to surround an outer side of the rotor, wherein the stator is fixed and the rotor rotates. The rotor and the stator respectively include a rotor core and a stator core which form magnetic paths.

A rotary electric machine is known in which cooling fluid is circulated inside the rotor core or inside the stator core, to cool the cores from the inside. JP 2016-54608 A discloses a rotor core (21) in which flow channels (40, 41a, 41b, 42a, 42b, 43, 44a, 44b) through which the cooling fluid flows are formed. The rotor core is cooled from the inside by the fluid flowing in the flow channel (40 or the like). JP 2004-312898 A discloses a rotor core (24) in which a radial hole (28) is formed and a stator core (stator element 40) in which a cooling duct (50) is formed. Air discharged from the radial hole (28) passes through the cooling duct (50) and cools the stator core (40) from the inside. JP 2014-230408 A discloses a rotor (16) in which an in-rotor coolant flow channel (22) is formed, and a stator core (12) in which an air flow channel (26) is formed. In the in-rotor coolant flow channel (22), a coolant supplied from a rotor shaft (18) flows. In addition, gas such as air is sent from an outer circumferential side of the stator core (12) to the air flow channel (26). The member names and the reference numerals described above in parentheses are member names and reference numerals used in the above-described references, and are not related to reference numerals used in the description of an embodiment of the present disclosure.

The stator core has teeth which are arranged with a spacing therebetween, and a coil is wound around the teeth. Because a part of the coil is placed in a slot which is a space between adjacent teeth, there have been problems that cooling cannot be sufficiently applied and the temperature tends to increase in this part of the coil.

An advantage of the present disclosure lies in improvement of cooling capability of a part of a coil placed in the slot.

SUMMARY

According to one aspect of the present disclosure, there is provided a rotary electric machine comprising: a rotor shaft; a rotor core through a center of which the rotor shaft passes, and a stator core around which a coil is wound. The rotor shaft defines a rotational axis of the rotary electric machine. An in-shaft flow channel through which a cooling fluid is sent is opened on an outer circumferential surface of the rotor shaft. An in-rotor-core flow channel is formed in the rotor core, an inner end of the in-rotor-core flow channel opposes the opening of the in-shaft flow channel of the outer circumferential surface of the rotor shaft, and an outer circumferential end of the in-rotor-core flow channel is opened on an outer circumferential surface of the rotor core. The stator core is placed to surround an outer circumference of the rotor core, and includes a yoke having a circular ring shape or a circular tube shape, and teeth placed on an inner circumferential surface of the yoke in a circumferential direction with a spacing therebetween. Each tooth is divided with a gap therebetween, at positions corresponding to an outer end of the in-rotor-core flow channel.

The cooling fluid flowing through the in-shaft flow channel and the in-rotor-core flow channel and ejected from the outer circumferential surface of the rotor core is sent to a gap of the divided portions of the tooth, directly contacts a coil conductor wiring placed between adjacent teeth, and cools the coil conductor wiring. With this configuration, the coil can be efficiently cooled.

An in-yoke flow channel may be formed in the yoke, an inner end of the in-yoke flow channel is opened with respect to the gap between the divided portions of the tooth, and an outer end of the in-yoke flow channel is opened on an outer circumferential surface of the yoke. At least a part of the cooling fluid sent to the gap of the tooth passes through the in-yoke flow channel and is discharged from the outer circumferential surface of the stator.

The rotary electric machine may further comprise a spacer extending from the yoke and interposing between divided portions of the tooth. A size of the spacer is smaller than a size of the tooth with respect to a size in the circumferential direction. With the spacer, falling of the divided portions of the tooth in the rotational axis direction can be suppressed.

The tooth may be divided at a center part in the rotational axis direction.

BRIEF DESCRIPTION OF DRAWINGS

Embodiment(s) of the present disclosure will be described based on the following figures, wherein.

DESCRIPTION OF EMBODIMENTS

Figure 1:
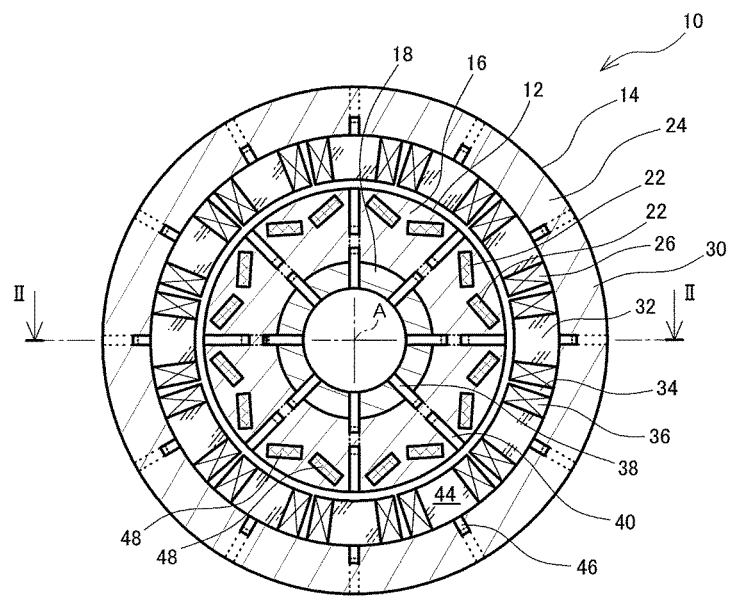
FIG. 1 is a diagram schematically showing a cross section, of a rotary electric machine according to an embodiment of the present disclosure, orthogonal to a rotational axis.
Figure 2:
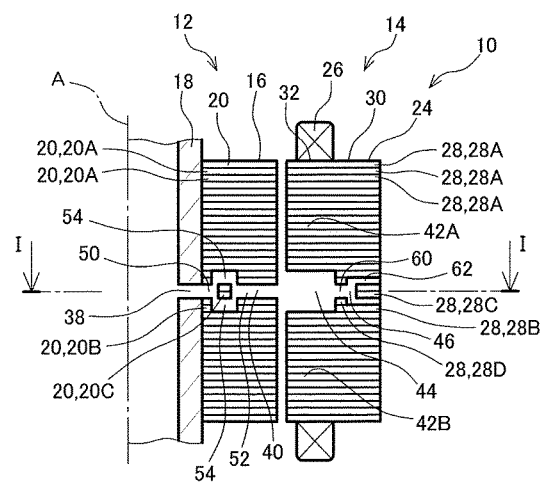
FIG. 2 is a diagram schematically showing a cross section, of a rotary electric machine according to an embodiment of the present disclosure, including a rotational axis.

An embodiment of the present disclosure will now be described with reference to the drawings. FIGS. 1 and 2 are diagrams schematically showing cross sections of a rotary electric machine 10 of the present embodiment. FIG. 1 shows a cross section orthogonal to an axis of the rotary electric machine 10, and in particular, shows a cross section along a line I-I shown in FIG. 2. FIG. 2 shows a cross section including the axis, and in particular, shows a cross section along a line II-II shown in FIG. 1.

The rotary electric machine 10 comprises a rotor 12, and a stator 14 placed surrounding and coaxially with the rotor 12. The rotor 12 includes a rotor core 16 having an approximate circular ring shape or an approximate circular tube shape, and a rotor shaft 18 which passes through a center of the rotor core 16. A center line of the rotor shaft 18 is a rotational axis A of the rotor 12. The rotor core 16 is formed by layering, in the direction of the rotational axis A, rotor core plates in which electromagnetic steel sheets are machined in a predetermined shape. Permanent magnets 22 are placed near an outer circumferential surface of the rotor core 16. In the rotary electric machine 10, one magnetic pole is formed by two permanent magnets 22 forming a V shape opened toward a radially outer side. As shown in the figures, a number of the magnetic poles of the rotor 12 is 8. The stator 14 includes a stator core 24, and a coil 26 wound around the stator core 24. The stator core 24 is formed by layering stator core plates 28 in which electromagnetic steel sheets are machined in a predetermined shape. The stator core 24 has a yoke 30 having an approximate circular ring shape or an approximate circular tube shape, and teeth 32 placed on an inner circumferential surface of the yoke 30, along a circumferential direction, and with a spacing therebetween. In the rotary electric machine 10, a number of the teeth 32 is 12. A space between adjacent teeth 32 is called a slot 34. A coil conductor wiring 36 is wound around the teeth 32, to form the coil 26.

The rotor shaft 18 is a hollow shaft, and a cooling fluid flows in the hollow space. For the cooling fluid, lubricating oil for lubricating a bearing or the like which supports the rotor 12 may be used. In the rotor shaft 18, an in-shaft flow channel 38 is formed which extends along a radial direction and connects the hollow space and an outer circumferential surface, and the in-shaft flow channel 38 is opened on the outer circumferential surface of the rotor shaft 18. The cooling fluid is sent to the outer circumferential surface of the rotor shaft 18 through the in-shaft flow channel 38. In the rotor core 16, an in-rotor-core flow channel 40 is formed. An inner end of the in-rotor-core flow channel 40 in a radial direction opposes the opening of the in-shaft flow channel 38 which is formed on the outer circumferential surface of the rotor shaft 18. In addition, an outer end of the in-rotor-core flow channel 40 in the radial direction is opened on an outer circumferential surface of the rotor core 16. The cooling fluid flows through the in-shaft flow channel 38 and the in-rotor-core flow channel 40, is sent to the outer circumference of the rotor core 16, and is ejected from an opening, of the in-rotor-core flow channel 40, formed on the outer circumferential surface of the rotor core.

Figure 3:
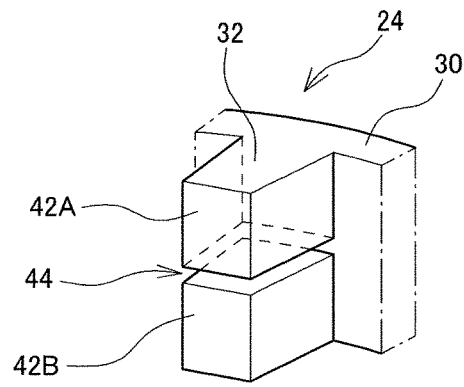
FIG. 3 is a perspective diagram showing one tooth of the rotary electric machine shown in FIGS. 1 and 2.

FIG. 3 is a perspective diagram showing one tooth 32. With reference to FIGS. 1, 2, and 3, a shape of the tooth 32 will now be described. The tooth 32 is divided into two portions in a direction of the rotational axis A (up-and-down direction in FIG. 3). The divided portions will hereinafter be described as tooth segments 42A and 42B. Between the two tooth segments 42A and 42B, a gap 44 is formed. The gap 44 will hereinafter be referred to as an inter-segment gap 44. The inter-segment gap 44 is defined in the direction of the rotational axis A by end surfaces of the tooth segments 42A and 42B, and in the radial direction by an inner circumferential surface of the yoke 30 at an outer side. An inner side of the inter-segment gap 44 in the radial direction is open toward the outer circumferential surface of the rotor 12, and both sides of the inter-segment gap 44 in the circumferential direction are open toward the slot 34. A dividing position of the tooth 32; that is, a position of the inter-segment gap 44, corresponds to an end of the in-rotor-core flow channel 40 at the outer side in the radial direction. For example, the inter-segment gap 44 is placed, in the direction of the rotational axis A, at the same position as an outer end of the in-rotor-core flow channel 40.

An in-yoke flow channel 46 is formed in the yoke 30 of the stator core 24. An inner end in the radial direction of the in-yoke flow channel 46 is opened on the inter-segment gap 44, and an outer end is opened on an outer circumferential surface of the yoke 30.

Figure 4:
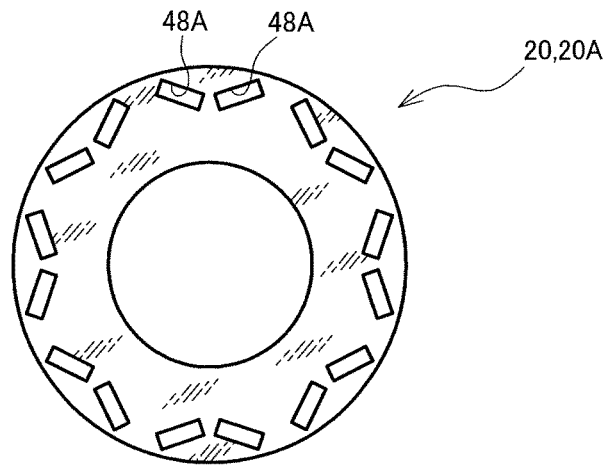
FIG. 4 is a diagram showing a core plate which is a part of a rotor, in particular, the core plate of a portion in which a flow channel for a cooling fluid is not provided.
Figure 5:
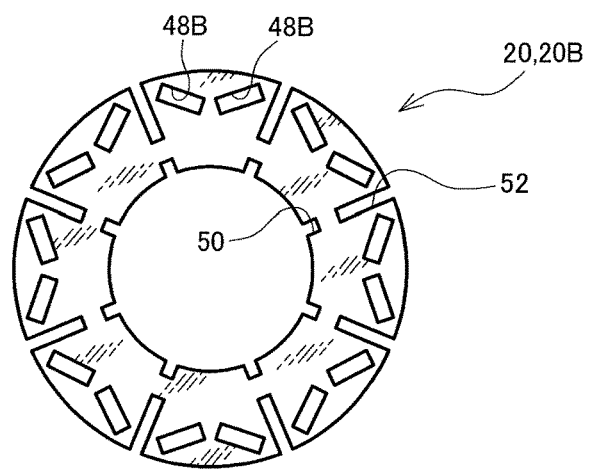
FIG. 5 is a diagram showing a core plate which is a part of a rotor, in particular, the core plate for forming a flow channel of a cooling fluid in a rotor core.
Figure 6:
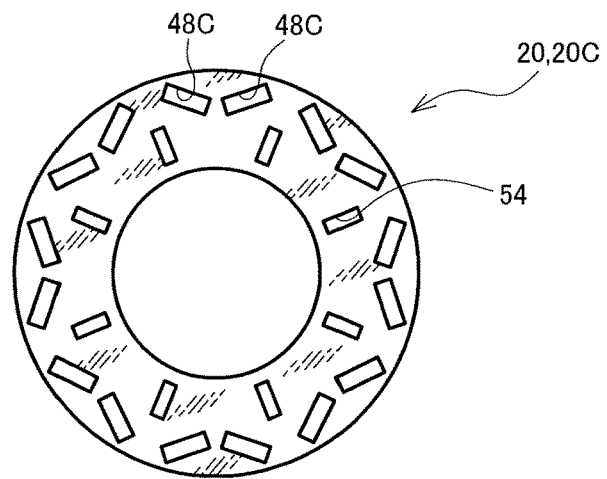
FIG. 6 is a diagram showing a core plate which is a part of a rotor, in particular, a core plate for forming a flow channel of a cooling fluid in a rotor core.
Figure 7:
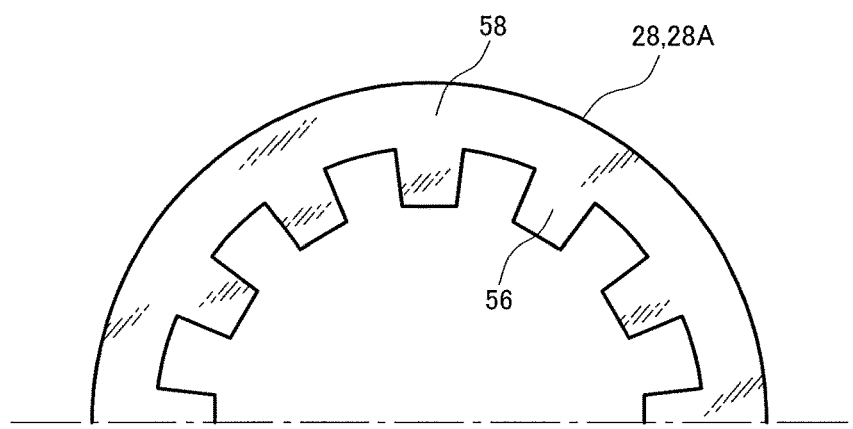
FIG. 7 is a diagram showing a core plate which is a part of a stator, in particular, a core plate having a protrusion for forming a tooth.

FIGS. 4 to 6 are diagrams showing a shape of the rotor core plates 20. The rotor core plates 20 include a plurality of types of plates for forming the in-rotor-core flow channel 40. The plates with the largest number are the plate having no slit for forming the in-rotor-core flow channel 40, shown in FIG. 4, and will hereinafter be called first rotor core plates 20A. There are two types of plates with slits for forming the in-rotor-core flow channel. One of these plates will hereinafter be called a second rotor core plate 20B (refer to FIG. 5), and the other will hereinafter be called a third rotor core plate 20C (refer to FIG. 6).

The first through third rotor core plates 20A, 20B, and 20C have circular ring shapes, and respectively have magnet holding holes 48A, 48B, and 48C formed near an outer circumferences thereof. The magnet holding holes 48A, 48B, and 48C are aligned along the direction of the rotational axis A, to thereby form an integral magnet holding hole 48 in the rotor core 16 (refer to FIG. 1). The permanent magnet 22 is held in the magnet holding hole 48.

On the second rotor core plate 20B, a slit extending in the radial direction is formed. The slit is interrupted partway. An inner portion in the radial direction will hereinafter be called a rotor inner slit 50, and an outer portion will hereinafter be called a rotor outer slit 52. A total of 8 rotor inner slits 50 and 8 rotor outer slits 52 are formed, and are respectively placed between magnetic poles. The numbers of the rotor inner slit 50 and the rotor outer slit 52 may be other than 8, and may alternatively be, for example, 4, 2, or the like. The rotor inner slit 50 extends to an inner circumferential edge of the second rotor core plate 20B and is open toward an inner side in the radial direction. The rotor outer slit 52 extends to an outer circumferential edge of the second rotor core plate 20B, and is open toward an outer side in the radial direction.

On the third rotor core plate 20C, a rotor center slit 54 which extends along the radial direction is formed. In the rotor center slit 54, the ends on the inner side and the outer side in the radial direction do not extend to the inner circumferential edge or to the outer circumferential edge of the third rotor core plate 20C. The rotor center slit 54 has an inner end in the radial direction overlapping an outer end of the rotor inner slit 50 of the second rotor core plate 20B, and an outer end overlapping an inner end of the rotor outer slit 52.

When the second rotor core plate 20B and the third rotor core plate 20C are placed adjacent each other, the rotor inner slit 50, the rotor center slit 54, and the rotor outer slit 52 are connected to each other, to thereby form the in-rotor-core flow channel 40 connecting the inner circumferential surface and the outer circumferential surface of the rotor core 16. In the rotary electric machine 10, some third rotor core plates 20C are placed on respective ends of some second rotor core plate 20B. The second and third rotor core plates 20B and 20C are placed at the center part of the rotor core 16 in the direction of the rotational axis A, so that the in-rotor-core flow channel 40 is formed at the center part of the rotor core 16.

FIGS. 7 to 10 are diagrams showing a shape of the stator core plate 28. FIGS. 7 to 10 show upper halves of the plates 28, and the lower halves are symmetric with the upper halves. The stator core plates 28 are formed from a plurality of types of plates for forming the inter-segment gap 44 and the in-yoke flow channel 46. The plates with the largest number are the plate having protrusions 56 which become the tooth 32, shown in FIG. 7. These plates will hereinafter be called first stator core plates 28A. The first stator core plate 28A has a circular ring portion 58 having a circular ring shape, and the protrusions 56 are arranged along an inner circumferential edge of the circular ring portion 58 with a spacing therebetween. The protrusions 56 are layered, to form the tooth 32.

Figure 8:
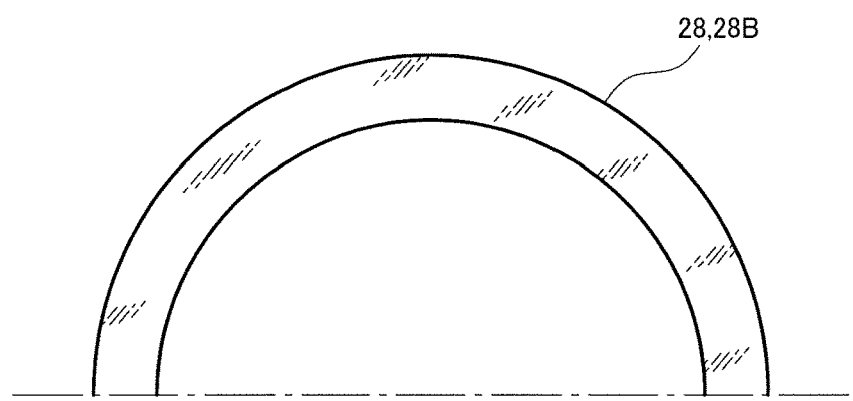
FIG. 8 is a diagram showing a core plate which is a part of a stator, in particular, a core plate for forming a gap in a tooth.

A plate shown in FIG. 8 has a circular ring shape, and, on this plate, unlike the first stator core plate 28A, the protrusion 56 is not provided. This plate will hereinafter be called a second stator core plate 28B. The second stator core plate 28B has the same shape as the circular ring portion 58 of the first stator core plate 28A.

Figure 9:
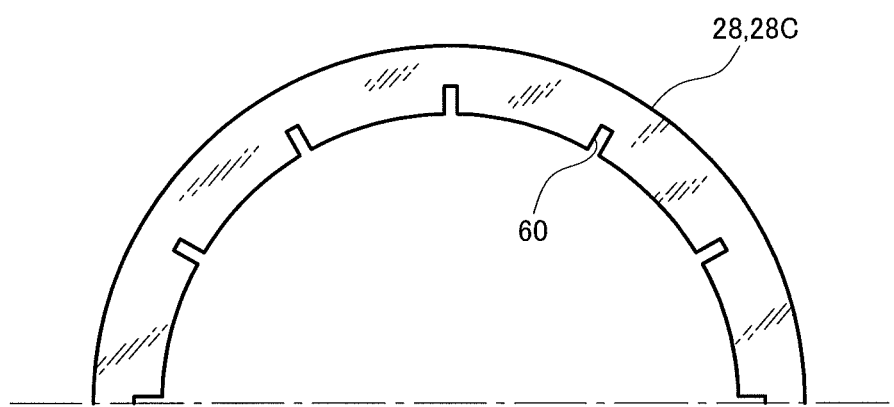
FIG. 9 is a diagram showing a core plate which is a part of a stator, in particular, a core plate for forming a gap in a tooth, and for forming a flow channel of a cooling fluid in a yoke.

A plate shown in FIG. 9 has a circular ring shape in which a slit 60 is formed, which extends along the radial direction. This plate will hereinafter be called a third stator core plate 28C. The third stator core plate 28C has the same shape as the second stator core plate 28B except that the slit 60 is formed. The slit 60 is provided at an inner side in the radial direction, extends to an inner circumferential edge of the third stator core plate 28C, and is open toward an inner side in the radial direction. This slit 60 will hereinafter be called a yoke inner slit 60.

Figure 10:
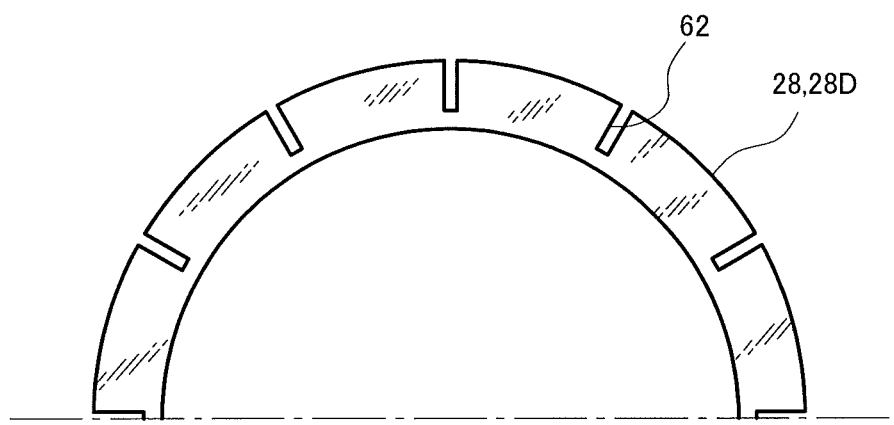
FIG. 10 is a diagram showing a core plate which is a part of a stator, in particular, a core plate for forming a gap in a tooth and for forming a flow channel of a cooling fluid in a yoke.

A plate shown in FIG. 10 has a circular ring shape in which a slit 62 is formed, which extends along a radial direction, and this plate will hereinafter be called a fourth stator core plate 28D. The fourth stator core plate 28D has the same shape as the second stator core plate 28B except that the slit 62 is formed. The slit 62 is provided at an outer side in the radial direction, extends to an outer circumferential edge of the fourth stator core plate 28D, and is open toward an outer side in the radial direction. This slit 62 will hereinafter be called a yoke outer slit 62.

In the rotary electric machine 10, the first through fourth stator core plates 28A, 28B, 28C, and 28D are arranged in a manner such that some third stator core plates 28C are placed at a center in the direction of the rotational axis A, some fourth stator core plates 28D are placed adjacent the some third stator core plates 28C, some second stator core plates 28B are placed at an outer side, in the direction of the rotational axis A, of the some fourth stator core plates 28D, and the first stator core plates 28A are placed at the outer side, in the direction of the rotational axis A, of the some second stator core plates 28B.

In other words, the second through fourth stator core plates 28B, 28C, and 28D are layered, and the layered structure is sandwiched by the first stator core plates 28A which are layered. With this structure, the teeth 32 are formed which are divided in the direction of the rotational axis A. In addition, an end at an outer side, in the radial direction, of the yoke inner slit 60 and an end at an inner side, in the radial direction, of the yoke outer slit 62 overlap each other, and, when the third stator core plate 28C and the fourth stator core plate 28D are placed adjacent to each other, the in-yoke flow channel 46 is formed connecting the inner circumferential surface and the outer circumferential surface of the yoke 30. Alternatively, the second stator core plate 28B may be omitted, and the first stator core plate 28A may be placed adjacent to the fourth stator core plate 28D.

The cooling fluid flowing inside the hollow rotor shaft 18 flows through the in-shaft flow channel 38 and the in-rotor-core flow channel 40, and is ejected to the outer side in the radial direction from the opening of the in-rotor-core flow channel 40 formed on the outer circumferential surface of the rotor core 16. The ejected cooling fluid hits the inner circumferential surface of the stator 14. A position where the cooling fluid hits moves with the rotation of the rotor 12. Therefore, the cooling fluid is ejected uniformly along the circumference toward the inner circumferential surface of the stator 14. A part of the ejected cooling fluid is sent to the inter-segment gap 44 placed corresponding to the opening of the in-rotor-core flow channel 40. The inter-segment gap 44 is open toward the coil conductor wiring 36 placed in the slot 34, and the cooling fluid sent to the inter-segment gap 44 directly hits the coil conductor wiring 36. With this process, the coil conductor wiring 36 can be efficiently cooled. The cooling fluid in the inter-segment gap 44 is pressed by the cooling fluid which is sent at a later time, and a part thereof reaches the outer circumferential surface of the stator 14 through the in-yoke flow channel 46 and is discharged. In a rotary electric machine in which the rotor shaft 18 is placed to be approximately horizontal, the cooling fluid in the inter-segment gap 44 positioned at a lower side is discharged from the outer circumferential surface also due to the force of gravity.

Because the cooling fluid ejected from the rotor core 16 flows through the inter-segment gap 44 and is sent to the outer circumferential surface of the stator core 24, the inter-segment gap 44 functions as a cooling fluid flow channel provided on the tooth 32.

Figure 11:
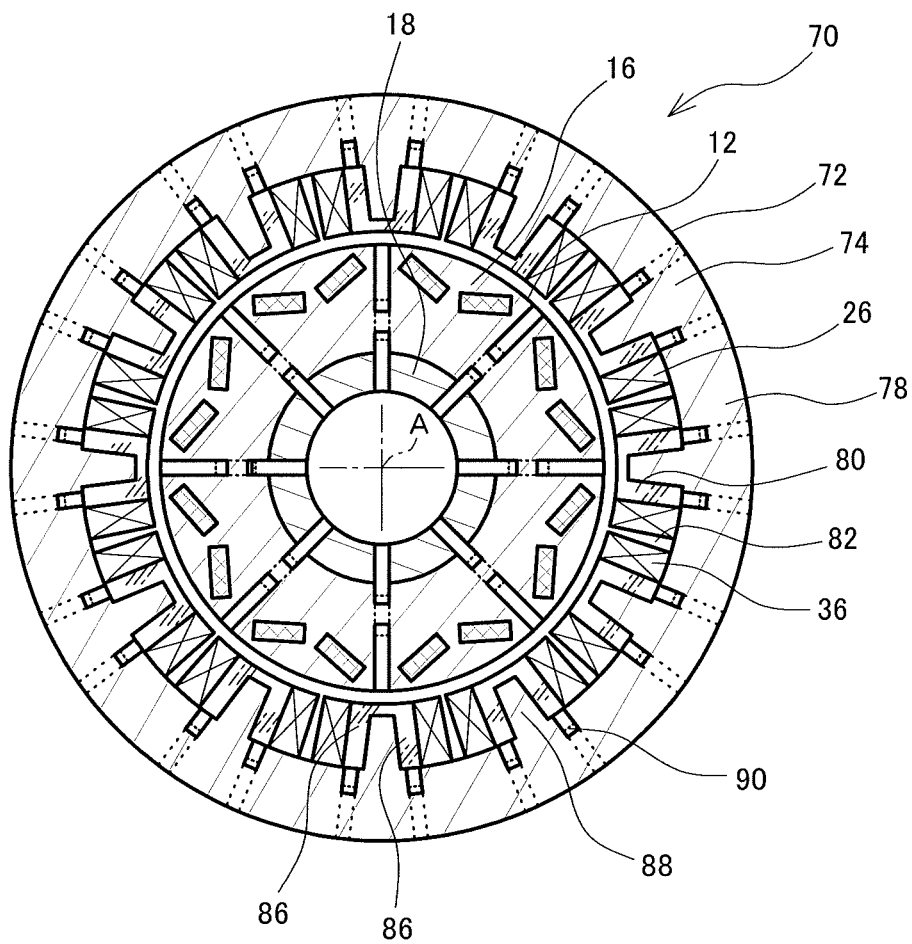
FIG. 11 is a diagram schematically showing a cross section, of a rotary electric machine according to another embodiment of the present disclosure, orthogonal to a rotational axis.

FIG. 11 is a diagram showing a rotary electric machine 70 according to another embodiment of the present disclosure, and schematically shows a cross section orthogonal to the rotational axis A. Constituting elements similar to those of the rotary electric machine 10 described above will be assigned the same reference numerals, and their descriptions will not be repeated.

The rotary electric machine 70 comprises the rotor 12, and a stator 72 placed surrounding and coaxially with the rotor 12. The stator 72 includes a stator core 74, and the coil 26 wound around the stator core 74. The stator core 74 is formed by layering stator core plates 76 (refer to FIGS. 13-16) in which electromagnetic steel sheets are machined in a predetermined shape. The stator core 74 has a yoke 78 having an approximate circular ring shape or an approximate circular tube shape, and teeth 80 placed on an inner circumferential surface of the yoke 78, with a spacing therebetween along a circumferential direction. A number of the teeth 80 of the rotary electric machine 70 is 12. A space between adjacent teeth 80 is called a slot 82. The coil conductor wiring 36 is wound around the teeth 80, to form the coil 26.

Figure 12:
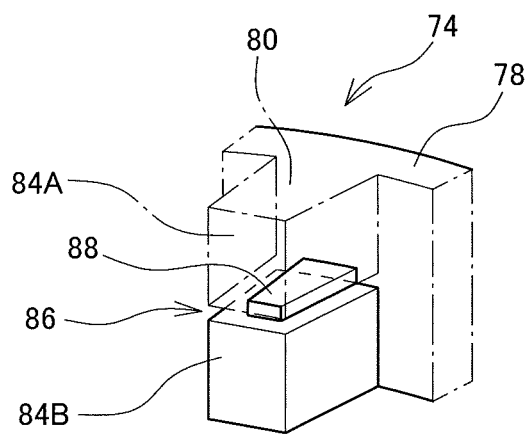
FIG. 12 is a perspective diagram showing one tooth of the rotary electric machine shown in FIG. 11.
Figure 13:
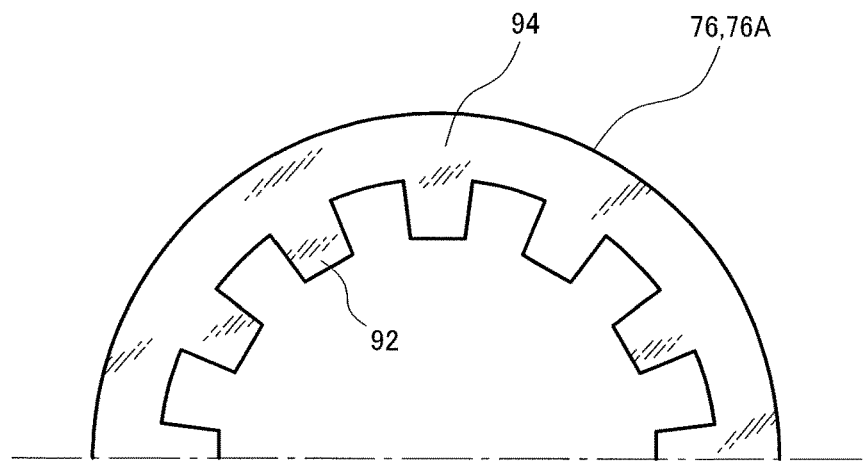
FIG. 13 is a diagram showing a core plate which is a part of a stator, in particular, a core plate having a protrusion for forming a tooth.

FIG. 12 is a perspective diagram showing one tooth 32. A shape of the tooth 80 will now be described with reference to FIGS. 11 and 12. The tooth 80 is divided into two portions in a direction of the rotational axis A (up-and-down direction of FIG. 12). The divided portions will hereinafter be called tooth segments 84A and 84B. In FIG. 12, the upper tooth segment 84A is shown in a state where elements behind the tooth segment can be seen through. A gap 86 is formed between the two tooth segments 84A and 84B. This gap 86 will hereinafter be called an inter-segment gap 86. Further, a spacer 88 is interposed between the tooth segments 84A and 84B. The spacer 88 extends from an inner wall surface of the yoke 78 toward an inner side in a radial direction, and is sandwiched by two tooth segments 84A and 84B. The spacer 88 suppresses falling of the tooth segments 84A and 84B in the direction of the rotational axis A. In addition, the spacer 88 suppresses bending deformation of a tooth protrusion 92 of a first stator core plate 76A, in particular, the tooth protrusion 92 adjacent the inter-segment gap 86. With regard to the sizes in the circumferential direction, the spacer 88 is smaller than the tooth 80, and the inter-segment gap 86 is formed on both sides of the spacer 88. Further, an end edge at an inner side, in the radial direction, of the spacer 88 does not extend to the end edge at an inner side of the tooth 80, and is positioned at an outer side in the radial direction. Near an end edge at an inner side, in the radial direction, of the tooth 80 also, a gap is formed between the two tooth segments 84A and 84B. The end edge at the inner side, in the radial direction, of the spacer 88 may be aligned with the end edge of the inner side of the tooth 80. An inner side of the inter-segment gap 86 in the radial direction is open toward the outer circumferential surface of the rotor 12, and both sides of the inter-segment gap 86 in the circumferential direction are open toward the slot 82. A dividing position of the tooth 80; that is, a position of the inter-segment gap 86, corresponds to an end at an outer side, in the radial direction, of the in-rotor-core flow channel 40. For example, the inter-segment gap 86 is placed at the same position as the outer end of the in-rotor-core flow channel 40 in the direction of the rotational axis A.

In the yoke 78 of the stator core 74, an in-yoke flow channel 90 is formed. An end, at an inner side of the radial direction, of the in-yoke flow channel 90 is opened on the inter-segment gap 86, and an end at an outer side is opened on an outer circumferential surface of the yoke 78.

FIGS. 13 to 16 are diagrams showing shapes of the stator core plates 76. In FIGS. 13 to 16, upper halves of the plates 76 are shown, and the lower halves are symmetric with the upper halves. The stator core plates 76 include a plurality of types of plates for forming the inter-segment gap 86, the spacer 88, and the in-yoke flow channel 90. The plates with a largest number are a plate having a tooth protrusion 92 which becomes the tooth, shown in FIG. 13. This plate will hereinafter be called the first stator core plate 76A. The first stator core plate 76A has a circular ring portion 94 having a circular ring shape, and the tooth protrusions 92 are arranged along an inner circumferential edge of the circular ring portion 94 with a spacing therebetween. The tooth 80 is formed by layering the tooth protrusions 92.

Figure 14:
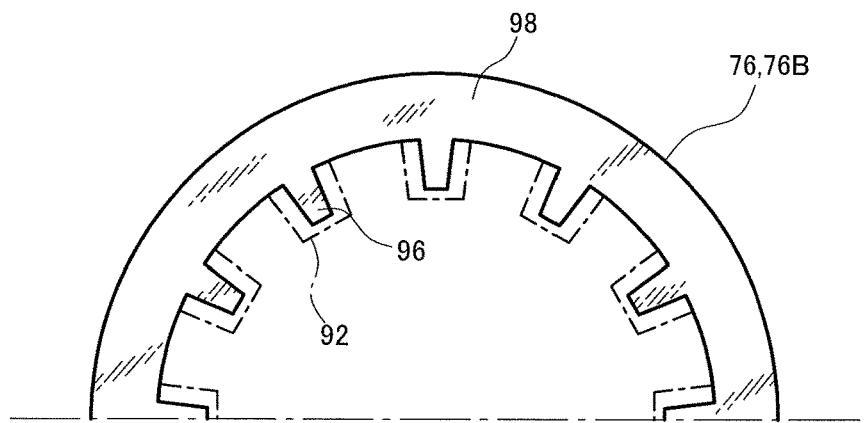
FIG. 14 is a diagram showing a core plate which is a part of a stator, in particular, a core plate for forming a gap in a tooth and for forming a spacer positioned in the gap.

A plate shown in FIG. 14 has a spacer protrusion 96 which becomes the spacer 88. This plate will hereinafter be called a second stator core plate 76B. The second stator core plate 76B has a circular ring portion 98 having the same shape as the circular ring portion 94 of the first stator core plate 76A, and the spacer protrusion 96 is arranged along the inner circumferential edge of the circular ring portion 98 with a spacing therebetween, and at the same pitch as that of the tooth protrusion 92. The spacer protrusion 96 is formed slightly smaller than the tooth protrusion 92; that is, narrower and/or shorter than the tooth protrusion 92.

Figure 15:
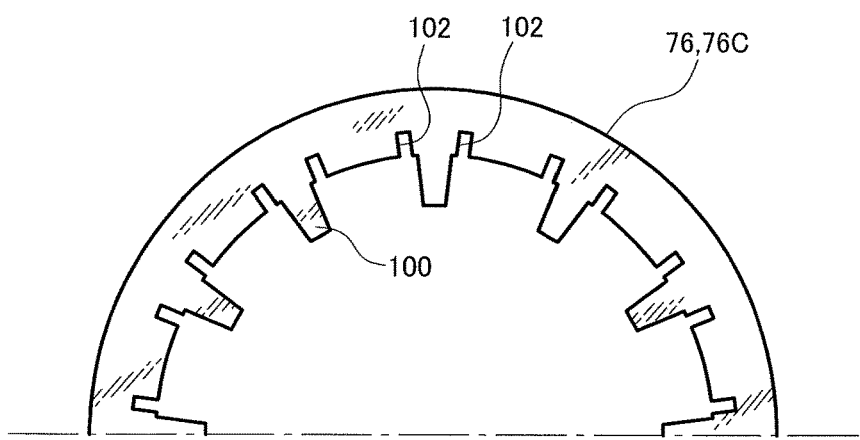
FIG. 15 is a diagram showing a core plate which is a part of a stator, in particular, a core plate for forming a gap in a tooth, and for forming a spacer positioned in the gap of the tooth and a cooling fluid flow channel in a yoke.

A plate shown in FIG. 15 has a spacer protrusion 100 which becomes the spacer 88, and a slit 102 which extends along the radial direction is formed. This plate will hereinafter be called a third stator core plate 76C. The third stator core plate 76C has the same shape as the second stator core plate 76B except that the slit 102 is formed. The slit 102 is formed at the inner side in the radial direction, extends to an inner circumferential edge of the third stator core plate 76C, and is open toward an inner side in the radial direction. This slit 102 will hereinafter be called a yoke inner slit 102.

Figure 16:
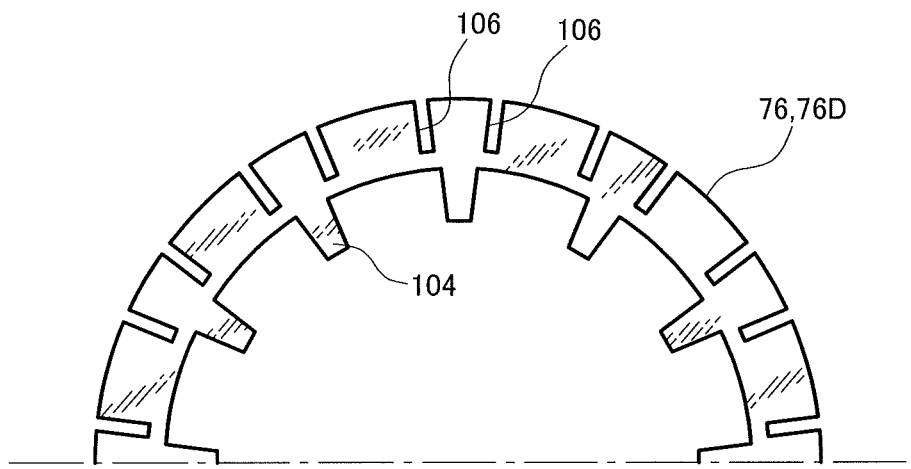
FIG. 16 is a diagram showing a core plate which is a part of a stator, in particular, a core plate for forming a gap in a tooth, and for forming a spacer positioned in the gap of the tooth and a cooling fluid flow channel in a yoke.

A plate shown in FIG. 16 has a spacer protrusion 104 which becomes the spacer 88, and a slit 106 which extends along the radial direction is formed. This plate will hereinafter be called a fourth stator core plate 76D. The fourth stator core plate 76D has the same shape as the second stator core plate 76B except that the slit 106 is formed. The slit 106 is formed at an outer side in the radial direction, extends to an outer circumferential edge of the fourth stator core plate 76D, and is open toward an outer side in the radial direction. This slit 106 will hereinafter be called a yoke outer slit 106.

In the rotary electric machine 70, the first through fourth stator core plates 76A, 76B, 76C, and 76D are arranged in a manner that some third stator core plates 76C are placed at a center in the direction of the rotational axis A, some fourth stator core plates 76D are placed adjacent to the some third stator core plates 76C, some second stator core plates 76B are placed at the outer side, in the direction of the rotational axis A, of the some fourth stator core plates 76D, and the first stator core plates 76A are placed at an outer side, in the direction of the rotational axis A, of the some second stator core plates 76B.

That is, the second through fourth stator core plates 76B, 76C, and 76D are layered, and the layered structure is sandwiched by the first stator core plates 76A which are layered. With this structure, the tooth 80 is formed which is divided in the direction of the rotational axis A and in which the spacer 88 is interposed. When the second through fourth stator core plates 76B, 76C, and 76D are layered, the respective spacer protrusions 96, 100, 104 are layered, to thereby form the spacer 88. In addition, an end at an outer side, in the radial direction, of the yoke inner slit 102 and an end at an inner side, in the radial direction, of the yoke outer slit 106 overlap each other, and when the third stator core plate 76C and the fourth stator core plate 76D are placed adjacent to each other, the in-yoke flow channel 90 is formed connecting the inner circumferential surface and the outer circumferential surface of the yoke 78. Alternatively, the second spacer core plate 76B may be omitted, and the first stator core plate 76A may be placed adjacent to the fourth stator core plate 76D.

The cooling fluid ejected from the rotor core 16 hits the inner circumferential surface of the stator 72. A position where the cooling fluid hits moves with the rotation of the rotor 12. Therefore, the cooling fluid is ejected uniformly along the circumference, toward the inner circumferential surface of the stator 72. A part of the ejected cooling fluid is sent to the inter-segment gap 86 placed corresponding to the opening of the in-rotor-core flow channel 40. The inter-segment gap 86 is open toward the coil conductor wiring 36 placed in the slot 82, and the cooling fluid sent to the inter-segment gap 86 directly contacts the coil conductor wiring 36. With this structure, the coil conductor wiring 36 can be efficiently cooled. The cooling fluid in the inter-segment gap 86 is pressed by the cooling fluid which is sent at a later time, and a part of the cooling fluid flows through the in-yoke flow channel 90, reaches the outer circumferential surface of the stator 72, and is discharged. In addition, in a rotary electric machine in which the rotor shaft 18 is placed to be approximately horizontal, the cooling fluid in the inter-segment gap 86 positioned at a lower side is discharged from the outer circumferential surface also due to the force of gravity.

Because the cooling fluid ejected from the rotor core 16 flows through the inter-segment gap 86 and is sent to the outer circumferential surface of the stator core 74, the inter-segment gap 86 functions as a cooling fluid flow channel provided on the tooth 80.

A position where the tooth is divided is not limited to the center in the direction of the rotational axis A, and a number of divisions of the tooth may alternatively be 3 or more.

The invention claimed is:
1. A rotary electric machine comprising:
a rotor shaft that defines a rotational axis, and in which an in-shaft flow channel is formed which is opened on an outer circumferential surface of the rotor shaft and through which a cooling fluid is sent;
a rotor core through a center of which the rotor shaft passes, and in which an in-rotor-core flow channel is formed having an inner end opposing the opening of the in-shaft flow channel and an outer end opened on an outer circumferential surface of the rotor core; and
a stator core that has a yoke having a circular ring shape or a circular tube shape, and teeth arranged on an inner circumferential surface of the yoke with a spacing therebetween in a circumferential direction, and that is placed to surround an outer circumference of the rotor core,
wherein each of the teeth is divided with a gap between divided segments at a position opposing the outer end of the in-rotor-core flow channel such that an opening of the gap on an inner circumferential side is larger along the rotational axis than the outer end of the in-rotor-core flow channel,
wherein in a cross-section perpendicular to the rotational axis, a cross-sectional shape of the gap between the divided segments is identical to a cross-sectional shape of the tooth, and the gap has a constant thickness along the rotational axis, and
wherein the teeth are arranged along the inner circumferential surface of the yoke such that the gaps of the teeth are surrounded by the yoke.

2. The rotary electric machine according to claim 1, wherein, in the yoke, an in-yoke flow channel is formed having an inner end opened on the gap of divided portions of the tooth, and an outer end opened on an outer circumferential surface of the yoke.

3. The rotary electric machine according to claim 1, wherein the tooth is divided at a center part in a direction along the rotational axis.

4. The rotary electric machine according to claim 1, wherein the tooth is divided at a center part in a direction along the rotational axis.

* * * * *